Figure 1:
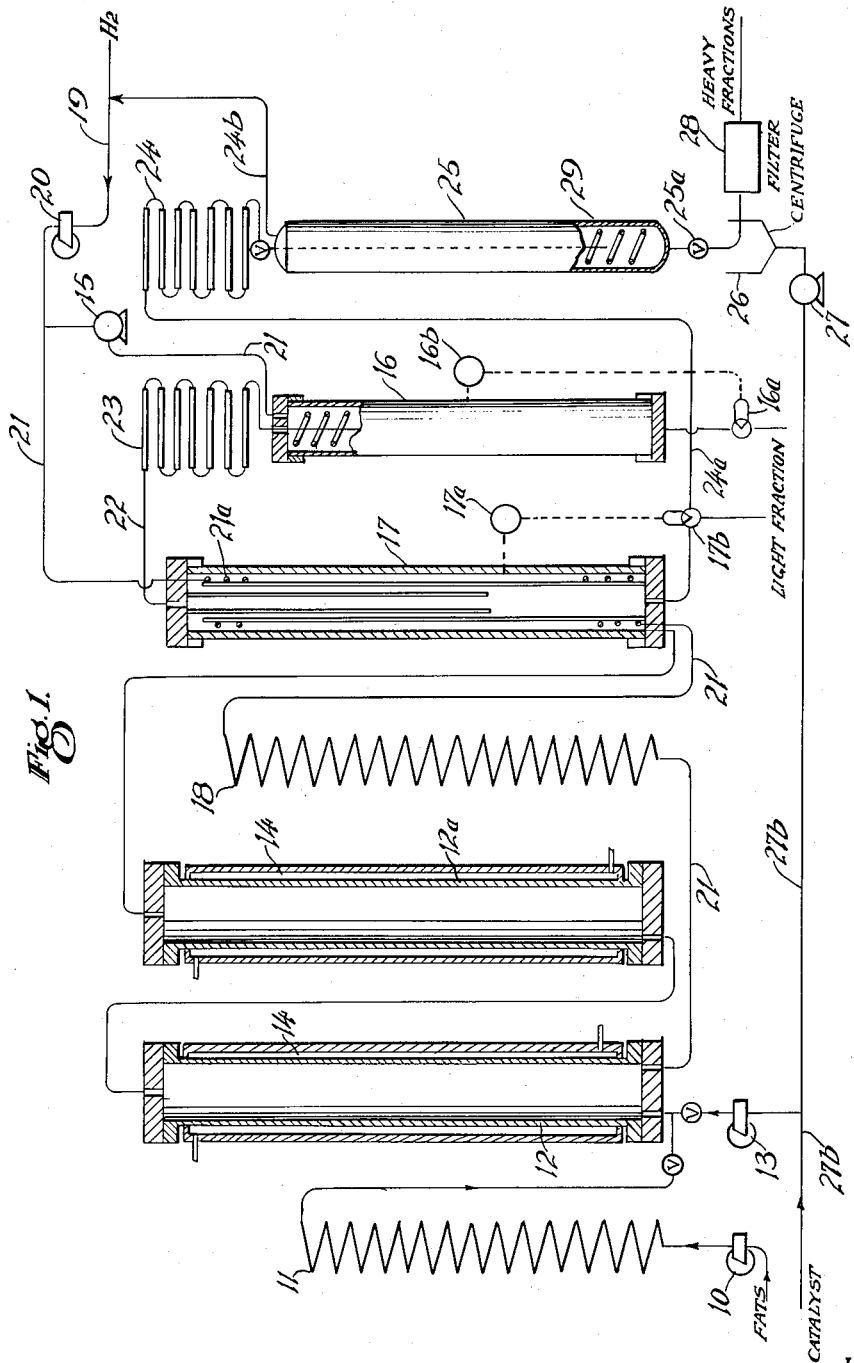

INVENTOR.
Vittorio de Nora
Ettore de Bartholomaeis
ATTORNEYS

United States Patent Office 2,750,429
Patented June 12, 1956

2,750,429
CONTINUOUS HYDROGENATION OF FATTY MATERIAL

Vittorio de Nora and Ettore de Bartholomaeis, Milan, Italy, assignors, by direct and mesne assignments, to Oronzio de Nora Impianti Elettrochimici, Milan, Italy, a company of Italy Application April 9, 1952, Serial No. 281,368

12 Claims. (Cl. 260—638)

This invention relates to improvements in the production of higher molecular alcohols and other hydrogenation products by the reaction of hydrogen or gases containing hydrogen with fatty or other organic materials under high pressures and temperatures in the presence of a catalyst. The process and apparatus is particularly adapted for the continuous hydrogenation of mixed fatty acid materials of low and high molecular weight such as are found in natural fats and oils.

The hydrogenation of fatty materials and other organic substances in the presence of catalysts is a common reaction used in a number of industrial operations. The hydrogen gas reacts rapidly at the surface of the catalyst and for each field of application there are conditions of temperature and pressure which are especially favorable. In some fields of use, a combination treatment with hydrogen and carbon monoxide or hydrogen with other gases is employed, as for example, in the process of the patent to Roelen, No. 2,327,066, granted August 17, 1943.

In the hydrogenation of fatty acids or fatty acid esters or glycerides or other carboxylic acid materials, the hydrogen reacts at the carboxylic group, yielding a corresponding alcohol or mixture of alcohols. Likewise, the treatment of olefines with both hydrogen and carbon monoxide together yields alcohols. Double bonds in raw material can be hydrogenated at the same time the carboxylic group is converted, but the reaction can be made to proceed in such a way that the double bonds remain unchanged.

Broadly considered, the invention is applicable in general to the treatment of any materials heretofore capable of being reduced by known hydrogenation processes under elevated temperatures and pressures. Examples of raw material which may be reduced by the present process include coconut oil, palm kernel oil, spermaceti, sperm oil, beeswax, linseed oil, cottonseed oil, tallow, stearin, olein, colophony and any carboxylic acid or mixtures of the same derived therefrom. The processes herein described are operable on the naturally occurring glycerides or on the fatty acids or esters prepared therefrom. Carboxylic acids from other sources may also be treated, as for example, naphthenic acids. Other processes to which the process is applicable include the reaction of petroleum derivatives or fractions from the Fischer-Tropsch process. The term "fatty material" as used in the specification and claims hereof is intended to include all such materials.

According to our present invention each of the above reduction reactions is carried out in an autoclave through which the fatty material undergoing hydrogenation is continuously flowed and in which temperature and hydrogen pressure conditions are continuously maintained at predetermined desirable levels.

The reduction of the carboxylic radical of an acid or fatty acid ester or glyeride to alcohol may be represented by the following equation:

$$R.COOH + 2H_2 \rightarrow R.CH_2OH + H_2O$$

This conversion can be considered as an equilibrium reaction and therefore governed by the mass-action law. The elimination of water and volatile products of the reaction will therefore further the production of alcohol. When the reduction of a mixture of acids is accomplished according to conventional procedure, the more volatile alcohols and water produced remain in the vapor phase in the reaction autoclave and produce a partial vapor pressure which diminishes the hydrogen pressure. This is a disadvantage for the reaction is slowed up, also if fatty acid esters with lower molecular weight alcohols are hydrogenated, the vapors of the lower molecular weight alcohols remaining in the autoclave slow the reaction and reduce the effective capacity of the apparatus.

A valuable embodiment of the present invention applicable to the treatment of organic substances leading to the production of reaction products of mixed volatility involves the use of heat and hydrogen pressure conditions adapted to continuously vaporize the more volatile reaction products and the conduction of hydrogen into and through the reacting mass in such a manner as to agitate the mass and assist in the removal of the vapors of the more volatile reduction products and also water vapors if the same be formed.

The removal of the water of reaction and the volatile products of the reaction causes the equilibrium to be displaced and to shift toward the formation of alcohols or other hydrogenation products being produced and the reaction proceeds at a more rapid rate.

Another advantage of this procedure is that the alcohol mixture which is produced is at once fractionated by this distillation or removal of volatile constituents and water in the hydrogen stream. The heavier fraction of alcohols of high molecular weight flowed from the autoclave may for some purposes be used directly without further fractionation.

Another valuable feature of the present invention is that the fatty materials and hydrogen are continuously flowed through the reaction zone or autoclave in such a manner as to insure complete reaction therein and the liquid reaction products separated from the hydrogen and lower boiling products and discharged from the reaction zone without reduction of the temperature and pressure in the reaction zone, which temperature and pressure is constantly maintained at the desired levels for best operating results.

Another advantage of our present process and apparatus is that a large excess of hydrogen under the desired hydrogenation pressure is continuously circulated through the fatty material undergoing hydrogenation. Preferably the volume of hydrogen relative to the volume of fatty material undergoing hydrogenation is more than 20 to 1, although ratios of from 10 to 40 volumes of hydrogen per volume of fatty material may be used, these volumes being measured at the temperature and pressure existing in the reaction autoclave.

The hydrogen speed through the autoclave is much greater than the speed at which the fatty material is pumped through the autoclave. This, therefore, brings about a more violent mixing and agitation of the fatty material and catalyst. A constant stream of fresh hydrogen gas provides rapid reaction at the surface of the catalyst, which permits a smaller amount of catalyst to be used, and as the water of reaction and volatile reaction products are continuously carried out of the autoclave by the hydrogen stream, the reaction proceeds at a more rapid rate than if water and low boiling reaction products were permitted to accumulate in the reaction autoclave.

Another feature of our invention is that this large volume of hydrogen is continuously flowed through the fatty material in the reaction autoclave and the water and lower boiling reaction products condensed and removed from the circulating hydrogen stream and the hydrogen reheated and recirculated through the fatty material in the autoclave without decompressing and recompressing the relatively large volume of hydrogen in circulation.

Another feature of our invention is that any higher boiling fraction of fatty material entrained in the hydrogen stream at the temperature of the hydrogenation autoclave may be condensed and returned to the body of liquid fatty material while the water and lower molecular weight materials volatilized at the reaction temperature are continuously carried away from the hydrogenated higher molecular weight fatty materials, thus resulting in an automatic separation of the higher alcohols or other hydrogenation products into fractions, which in many instances may be used as commercial products.

Various other objects and advantages of our invention will appear as this description proceeds.

Figure 2:
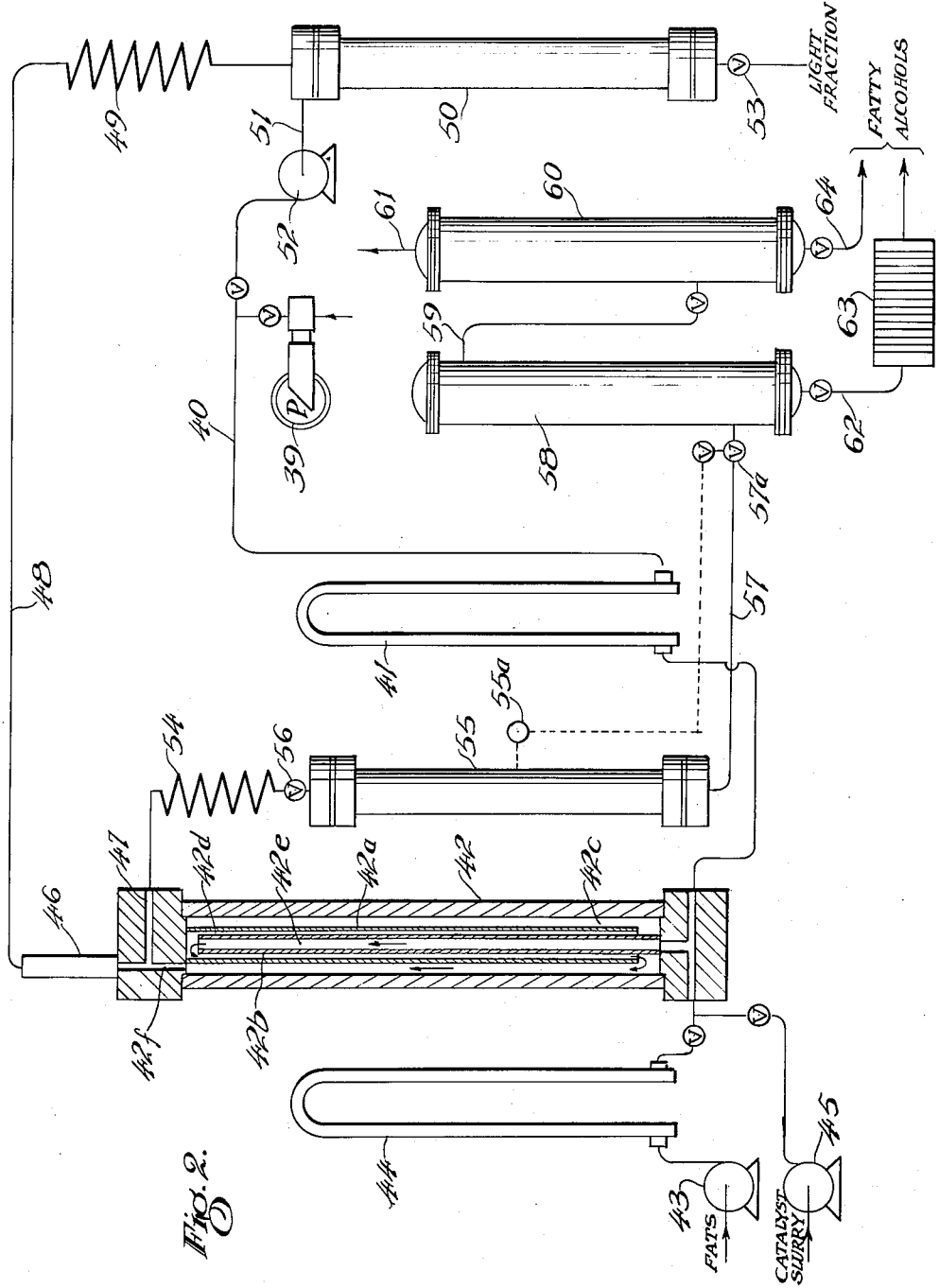

Referring now to the drawings which illustrate diagrammatically preferred arrangements of apparatus in which the process of our invention may be practiced, Fig. 1 is a diagrammatic illustration of a preferred method of practicing our process;

Fig. 2 is a diagrammatic illustration of a modification of the process apparatus of Fig. 1 also adapted for continuous operation.

Various other modifications and adaptations of our process and apparatus will be apparent as this description proceeds.

Hereinafter the process is described with reference to the reduction of a mixture of fatty acids obtained by splitting coconut oil. This same procedure, however, can be used in any hydrogenation process or in any process involving reactions of hydrogen and other gases with liquids at high pressure and temperature, or in any hydrogenation process in which the elimination of water and products in vapor form displaces the reaction in the desired direction.

The mixture of coconut oil fatty acids is treated at a hydrogen pressure of about 250 atmospheres, at a temperature of about 300° C. in the presence of a catalyst such as Cu—Cr bases or any suitable copper containing catalyst. By circulating the hydrogen, under the conditions described above, the acids are not only completely reduced but the mixture of alcohols obtained, having 6 to 18 atoms of carbon, is fractionated by the removal of the lower molecular alcohols in the hydrogen stream, and the heavier alcohols are continuously discharged from the reaction zone.

A large excess of hydrogen over that theoretically necessary to complete the desired hydrogenation reaction is circulated through the fatty material undergoing hydrogenation. Usually we prefer to circulate from 30 to 60 moles of hydrogen per mole of product to be hydrogenated. This in practice involves a ratio of hydrogen flow to liquid flow of approximately fifteen to thirty volumes of hydrogen to one volume of liquid at the temperature and pressure existing in the autoclave. With a high circulation rate of the hydrogen with reference to the fatty material, it is possible to hydrogenate coconut oils or coconut oil fatty acids to the corresponding alcohols using temperatures of the order of 300° to 330° C. and pressures of about 250 atmospheres.

While we prefer to flow the fatty material mixed with the catalyst and the hydrogen in concurrent direction through the reaction zone or autoclave, it is possible to flow the fatty material countercurrent to the hydrogen flow and to use fixed catalysts. The use of fixed catalysts is, however, not very satisfactory in a continuous process because of the rapid exhaustion of the catalyst and the necessity for frequent renewal thereof and the flow of the fatty material and hydrogen in countercurrent direction requires more power and leads to inefficient heat utilization.

One of the objections to continuous processes of hydrogenation as practiced prior to our invention is that some unhydrogenated product is usually carried over into the finished product and the more thorough the mixing of the fatty material and hydrogen in the reaction autoclave, the greater the likelihood of unreduced material in the finished product.

It is a feature of our invention that the fatty material and hydrogen are flowed through the autoclave in such a manner as to provide thorough mixing and yet so that none of the fatty material can by-pass from the entrance to the exit of the reaction zone in a way that it escapes the proper hydrogenation, and it is also a feature of our invention that the length of the hydrogenation time can be controlled by the rate of flow of the materials through the reaction zone so as to insure the desired degree of hydrogenation, and that the hydrogenation shall not be carried beyond the desired point and lead, for example, to the formation of hydrocarbons instead of alcohols.

In the embodiment of the process illustrated in Fig. 1, the fats are pumped from a suitable storage source by means of filling pump 10 operating at high pressure and after passing through the fats preheater 11, are injected into the first autoclave 12 at the desired hydrogenation pressure and temperature.

The catalyst, formed into a slurry with a small amount of fatty material or previously produced alcohol or esters, is injected by means of slurry injection pump 13 operating at the hydrogenation pressure, into the first autoclave 12. The separate feeding of the fats and catalyst is desirable to avoid overheating of the catalyst in the presence of hot fats and prior to the introduction of the hydrogen. The temperature of the first autoclave 12, as well as that of the second autoclave 12a, is controlled by means of a heating jacket 14 to maintain the autoclave at the desired hydrogenation temperature.

Hydrogen is circulated at the desired rate and at the hydrogenation temperature and pressure through the first autoclave 12. The hydrogen circulation is obtained by means of the recirculating pump 15 which takes the hydrogen from the overheads autoclave 16 and pumps it back into the autoclave 12. The hydrogen is preheated in the heat exchange separator 17 and heated in the hydrogen heater 18 to the desired temperature. This is done before entering the first autoclave 12. Fresh hydrogen is introduced from the hydrogen storage through the line 19 and the pressure in the autoclaves and in the hydrogen circuit is maintained at the desired value by means of the hydrogen compressor 20 which takes the hydrogen from the hydrogen storage. Hydrogen is pumped through the autoclaves in a volumetric ratio of approximately 10 to 40 volumes of hydrogen as compared to the volume of fats at the pressure and temperature existing in the autoclaves. The reaction which takes place in the first autoclave 12 transforms the fats into esters and partial alcohols. The whole mixture of esters, alcohols, hydrogen, catalyst and water reaction is transferred into the second autoclave 12a where the hydrogenation reaction is completed. The autoclaves are preferably arranged to prevent the mixing of the incoming liquid with the outgoing liquid. One means of doing this consists in two concentric tubes placed inside the autoclaves which have a diameter about one half that of the autoclave and are only slightly different in diameter from one another so that the liquid can flow in only one direction between the two concentric tubes. Such an arrangement is indicated in Fig. 2.

The mixture of the completely hydrogenated fat leaves the second autoclave 12a together with the hydrogen, water of reaction and catalyst and enters the heat exchange separator 17 where it is cooled by means of the hydrogen in line 21 passing through the coil 21a which goes through the heat exchange separator. In the heat exchange separator 17 the water and lighter alcohols in vapor form and the hydrogen are separated from the liquid hydrogenation products which contain the catalyst. The hydrogen, water and volatile reaction products flow through the line 22 and cooler 23 to the overheads autoclave 16. In the overheads or condensate autoclave 16 hydrogen is separated from the condensate and passes into the hydrogen line 21 containing the recirculating pump 15. Except for the normal pressure drop in passing through the hydrogen circuit, the large volume of hydrogen in circulation is maintained at the hydrogenation pressure and is not decompressed and recompressed in its circulation through the hydrogenation autoclaves, the heat exchange separator and the condensate autoclave. The hydrogen absorbed in the reaction is made up by fresh hydrogen coming in from the line 19 and the pressure in the hydrogen circuit is maintained by the compressor 20.

The water and lighter alcohols or other volatile reaction products are discharged from the autoclave 16 through the valve 16a which may be automatically controlled through a solenoid or other electrical control by a liquid level control 16b in the condensate autoclave 16.

The crude alcohols or other liquid hydrogenation products from the heat exchange separator 17 are transferred through the line 24a to the crude cooler 24 and from there to crude decompressor 25 where the pressure is released. The flow of the liquid crude through the line 24a is controlled by a valve 17b which may be a floating type of solenoid valve controlled from a liquid level controller 17a in the separator 17. Hydrogen escapes in the decompressor 25 and is vented back to storage or to the line 19 through line 24b. The crude, which still contains the catalyst, is discharged through the valve 25a which likewise may be automatically controlled by the level of the liquid in the decompressor 25 if desired, to the centrifuge 26 where the catalyst is separated from the liquid crude. The catalyst in the form of a slurry goes to the pump 27 and from there through the slurry line 27a to pump 13 where it is mixed with fresh catalyst slurry introduced in line 27b and pumped through the autoclaves. The crude goes to the filter 28 and from there to the fatty alcohol or heavy fraction storage (not shown). A water cooled coil 29 may be provided in the decompressor 25 to cool the alcohols to the desired temperature.

In the system and apparatus illustrated in Fig. 2 the hydrogen or hydrogen containing gas is introduced into the system at the desired hydrogenation pressure and maintained at this pressure by means of a compressor 39 and flows through the conduit 40 and the heater 41 into the bottom of the reaction autoclave 42. The autoclave 42 is preferably provided with concentric tubes 42a and 42b on the interior thereof which provide a long and constricted passage for the flow of the hydrogen and fatty material through the autoclave.

The fatty material is introduced from any suitable source by the pump 43 which operates at sufficient pressure to overcome the hydrogen pressure of the system. From the pump 43 the fatty material flows through a heater 44 and into the bottom of the autoclave 42. The catalyst, mixed in a suitable slurry of fatty material or previously produced alcohol, is pumped by the pump 45 into the fatty material just prior to the introduction of the fatty material into the bottom of the autoclave 42. The fatty material, catalyst and hydrogen enter the inner passage 42e of the autoclave 42, flow upward to the top of the autoclave and then downward through the intermediate passage 42d to the bottom of the tube 42a which projects approximately to the bottom of the autoclave 42 and then flow upward through the outer passage 42c to the outlet 42f at the top of autoclave 42.

While only two concentric tubes have been illustrated in autoclave 42, it will be understood that a larger number of concentric tubes providing for a tortuous flow of materials through the autoclave may be provided.

At the top of the autoclave 42 the hydrogen gas, carrying water and lighter materials vaporized at the temperature of the autoclave, flows into a dephlegmator column 46. In the dephlegmator column 46 the materials flowing therethrough are cooled and any entrained liquid and vapors which condense at approximately the temperature of the autoclave are stripped out of the hydrogen stream and flow back from the dephlegmator 46 into the top of the autoclave 42 where they flow out with the hydrogenated liquid material from the passage 47.

The remainder of the hydrogen gas stream flowing through the dephlegmator 46 carries any water formed in the reaction and alcohols or hydrocarbons which volatilize at a temperature below the reaction temperature in the autoclave 42. This material flows through the line 48 to condenser 49 in which the lighter portions of the volatilized constituents and the water vapor are condensed to liquid.

From the condenser 49 the materials flow into an overheads discharge autoclave 50 where the hydrogen separates from the condensed liquids and flows through the line 51 to a pump 52 by which it is again recirculated through the hydrogen circuit. Inasmuch as the hydrogen in the entire hydrogenation circuit is maintained at constant reactant pressure by the compressor 39, the pump 52 operates to keep the hydrogen in circulation at a balanced pressure and needs only overcome the resistance in the hydrogen lines and the rest of the system. The hydrogen is not decompressed and recompressed in this circuit, and except for the normal pressure drop in passing through the hydrogen circuit, it is maintained substantially at the hydrogenation pressure.

Periodically the condensed liquids in the overheads discharge autoclave 50 are discharged from this autoclave by opening the valve 53 and when hydrogen begins to flow through the valve 53, the valve is closed. As the volume of liquids condensed in the overheads condenser 50 is small with reference to the volume of hydrogen in the circuit, the hydrogen pressure is not materially reduced and whatever reduction in pressure takes place is immediately restored by the hydrogen compressor 39 pumping fresh hydrogen into the hydrogen circuit at the desired pressure.

From the liquids discharge outlet 47 of the autoclave 42 the hydrogenated fatty material flows through a cooler 54 into a receiver 55 for the hydrogenated fatty materials and from the bottom of the receiver 55 the hydrogenated material flows through the line 57 and valve 57a into the discharge compressor 58. By proper regulation of the valve 57a with reference to the amount of fatty material pumped through the hydrogenating system, a continuous flow of fatty material may be maintained from the pump 43 through the autoclave 42 and into the discharge decompressor tank 58. While valve 57a may be manually controlled, it is preferably an electrically operated floating type solenoid valve controlled by a level controller 55a in the receiver 55 so as to increase or decrease the size of the valve opening as the level of hydrogenated material in receiver 55 rises and falls. The rate of flow maintained by the pump 43 is such as to insure the desired degree of hydrogenation of the fatty material in its passage through the autoclave 42.

The hydrogen, which separates from the hydrogenated fatty material in the discharge tank 58, flows through the line 59 into a hydrogen vent tank 60 and from the top of the tank 60 through the hydrogen line 61 back to the hydrogen storage or to the hydrogen line leading to the compressor 39.

The valve 56 may be used to control the flow of hydrogenated fatty material into the receiver autoclave 55. From the bottom of the discharge tank 58 the liquid hydrogenated material flows through the line 62 to a filter 63 or a centrifuge or any other apparatus suitable for separating the catalyst from the hydrogenated fatty material.

Any liquid material which condenses out of the hydrogen in the hydrogen vent tank 60 may be discharged through the line 64 to the storage tanks (not shown) for the hydrogenated fatty material.

A heating jacket may be provided around the autoclave 42 to maintain the autoclave at the desired hydrogenating temperature.

During hydrogenation of the fatty material in the autoclave 42, the fatty material is pumped through the autoclave at the rate of approximately 1 volume of fatty material to 10 to 40 volumes of hydrogen and the autoclave is designed to retain the fatty material in the autoclave for sufficient length of time to complete the desired hydrogenation reaction.

By suitable control of the valve 57a it is possible to maintain a substantially continuous flow of materials being hydrogenated through the autoclave 42 and the receiver autoclave 55 and into the discharge tank 58.

This application is a continuation-in-part of our application Serial No. 28,604, filed May 22, 1948, now Patent No. 2,597,074.

While our process and apparatus have been illustrated in diagrammatic form, it will be obvious that certain modifications and changes may be made therein without departing from the spirit of our invention or the scope of the following claims.

We claim:

1. The method of high pressure hydrogenation which comprises flowing fatty material continuously through a reaction zone maintained at hydrogenation pressure and temperature, introducing a catalyst into the fatty material, flowing hydrogen in excess through the fatty material in said reaction zone at the pressure and temperature of the reaction zone at a speed greater than that of the fatty material, the volumetric rate of flow of the hydrogen being at least ten times the volumetric flow of the fatty material through the reaction zone, causing the fatty material in said zone to flow in a tortuous path while maintaining the hydrogenation pressure and temperature therein, separating the excess hydrogen and products which volatilize from the hydrogenated fatty material, continuously flowing the hydrogenated fatty material from the reaction zone while maintaining the pressure in the reaction zone, separating the volatilized products from the excess hydrogen and flowing the excess hydrogen back through the reaction zone while maintaining the hydrogenation pressure on the hydrogen and separately maintaining the flow of the fatty material through the reaction zone at a rate which accomplishes the desired degree of hydrogenation.

2. The method of high pressure hydrogenation which comprises pumping a fatty material continuously through a reaction zone maintained at hydrogenation pressure and temperature, flowing a catalyst suspended in the fatty material through said reaction zone, flowing hydrogen through the zone at a speed greater than that of the fatty material under the pressure and temperature of the reaction zone at a volumetric rate at least ten times the volumetric rate of flow of said fatty material through said reaction zone, causing the fatty material in said zone to flow in a tortuous path while maintaining the hydrogenation pressure and temperature therein, separating the excess hydrogen and volatile reaction products from the liquid fatty material, and separating the volatile reaction products from the hydrogen and recirculating the excess hydrogen through the reaction zone while maintaining the hydrogenation pressure on said hydrogen and said fatty material, separately maintaining the rate of flow of the fatty material through the reaction zone to insure the desired degree of hydrogenation, and continuously flowing the hydrogenated fatty material from the reaction zone without reducing the pressure in the reaction zone.

3. The method of high pressure hydrogenation which comprises pumping fatty material and catalyst continuously through a reaction zone maintained at hydrogenation pressure and temperature, flowing hydrogen through the zone at a speed greater than that of the fatty material under the pressure and temperature of the reaction zone at a volumetric rate at least ten times the volumetric rate of flow of said fatty material through said reaction zone, causing the fatty material in said zone to flow in a tortuous path while maintaining the hydrogenation pressure and temperature therein, flowing the hydrogenated fatty material, catalyst and hydrogen continuously from said reaction zone, cooling the hydrogenated fatty material, catalyst and hydrogen, separating the excess hydrogen and volatile reaction products from the liquid fatty material without reducing the pressure on the hydrogen or the liquid fatty material, cooling and stripping from the separated hydrogen materials which are liquid near the temperature and pressure of the reaction zone and returning said stripped materials to the liquid hydrogenated material and recirculating said hydrogen, separately maintaining the rate of flow of the fatty material through the reaction zone to insure the desired degree of hydrogenation, and continuously flowing the hydrogenated fatty material from the reaction zone without reducing the pressure and temperature in the reaction zone.

4. The method of high pressure hydrogenation which comprises pumping fatty material continuously from a source of fatty material through a heater and into a reaction autoclave, continuously maintaining the desired high pressures and temperatures in said autoclave, continuously pumping a copper containing catalyst in the form of a metallic powder suspended in fatty material into said first mentioned fatty material adjacent the inlet of said fatty material after the first mentioned fatty material has been heated and into the reaction autoclave, continuously flowing hydrogen at a volumetric rate at least ten times the volumetric rate of said fatty material at the pressure of said reaction autoclave through a heater and into said fatty material and catalyst adjacent the inlet to said reaction autoclave, maintaining the materials in said reaction autoclave at the hydrogenation pressure and temperature, flowing said hydrogen at a speed greater than that of the fatty material with the fatty material and catalyst through said reaction autoclave in a tortuous path, separately maintaining the rate of flow of the fatty material through said reaction autoclave to insure the desired degree of hydrogenation, separating the excess hydrogen and volatile reaction products from the liquid hydrogenated material, and continuously flowing the excess hydrogen and liquid hydrogenated material from the reaction autoclave while maintaining the hydrogenation pressure and temperature in said autoclave.

5. The method of high pressure hydrogenation which comprises pumping fatty material continuously from a source of fatty material through a heater and into a reaction autoclave, continuously maintaining the desired high pressures and temperatures in said autoclave, continuously pumping a copper containing catalyst in the form of a metallic powder suspended in fatty material into said first mentioned fatty material after said first mentioned fatty material has passed through said heater at a place adjacent the inlet of said fatty material into the reaction autoclave, continuously flowing hydrogen at a volumetric rate at least ten times the volumetric rate of said fatty material at the pressure of said reaction autoclave through a heater and into said fatty material and catalyst adjacent the inlet to said reaction autoclave, maintaining the hydrogenation pressure and temperature on said material in said reaction autoclave, flowing said hydrogen at a speed greater than that of the fatty material with the fatty material and catalyst in an elongated tortuous path through said reaction autoclave, separately maintaining the rate of flow of the fatty material through said reaction autoclave to insure the desired degree of hydrogenation, separating the excess hydrogen and volatile reaction products from the liquid hydrogenated material, and continuously flowing the excess hydrogen and liquid hydrogenated material from the reaction autoclave while maintaining the hydrogenation pressure and temperature in said autoclave, and removing the catalyst from said liquid hydrogenated material and returning the removed catalyst to the reaction autoclave.

6. The method of high pressure hydrogenation which comprises pumping fatty material continuously from a source of fatty material through a heater and into a reaction zone including a reaction autoclave and a dephlegmator separator, continuously maintaining the desired high pressures and temperatures in said reaction zone, continuously pumping a copper containing catalyst in the form of a metallic powder suspended in fatty material into said first mentioned fatty material after said first mentioned fatty material has passed through said heater at a place adjacent the inlet of said fatty material into the reaction zone, continuously flowing hydrogen at a volumetric rate at least ten times the volumetric rate of said fatty material at the pressure of said reaction zone through a heater and into said fatty material and catalyst adjacent the inlet to said reaction zone, flowing said hydrogen at a speed greater than that of the fatty material with the fatty material and catalyst in an elongated tortuous path through said reaction autoclave and into said dephlegmator separator, separately maintaining the rate of flow of the fatty material through the reaction zone to insure the desired degree of hydrogenation, separating the excess hydrogen and volatile reaction products from the liquid hydrogenated material in said dephlegmator and returning the liquid products to the liquid hydrogenated material, and continuously flowing the excess hydrogen and liquid hydrogenated material separately from the dephlegmator while maintaining the hydrogenation pressure and temperature in said reaction zone.

7. The method of high pressure hydrogenation which comprises pumping fatty material continuously from a source of fatty material through a heater and into a pressure reaction system including a reaction autoclave, a crude separator autoclave and an overheads separation autoclave, continuously maintaining the desired high pressures and temperatures in said reaction system, continuously pumping a copper containing catalyst in the form of a metallic powder suspended in fatty material into said first mentioned fatty material after said first mentioned fatty material has passed through said heater at a place adjacent the inlet of said fatty material into the reaction autoclave, continuously flowing hydrogen at a volumetric rate at least ten times the volumetric rate of said fatty material at the pressure of said reaction zone through a heater and into said fatty material and catalyst adjacent the inlet to said reaction autoclave, flowing said hydrogen at a speed greater than that of the fatty material with the fatty material and catalyst in a tortuous path through said reaction autoclave and into said crude separator, separating the excess hydrogen and volatile reaction products from the liquid hydrogenated material in said crude separator, separately maintaining the rate of flow of the fatty material through the reaction autoclave to insure the desired degree of hydrogenation, continuously flowing the excess hydrogen and liquid hydrogenated material separately from the crude separator while maintaining the hydrogenation pressure and temperature in said reaction zone, continuously cooling and condensing liquid products from said excess hydrogen and flowing said excess hydrogen back through said hydrogen heater and reaction system while maintaining the hydrogenation pressure on said hydrogen circuit.

8. The method of hydrogenation at pressures about 200 atmospheres and temperatures about 300° C. which comprises flowing fatty material and a catalyst continuously through a reaction autoclave in a tortuous path at the hydrogenation pressure and temperature, flowing hydrogen continuously through the more slowly flowing fatty material in said reaction autoclave in the ratio of 10 to 40 volumes of hydrogen per volume of fatty material at the hydrogenation pressure and temperature, separating the hydrogen from the fatty material at the hydrogenation pressure and continuously circulating the separated hydrogen with the materials vaporized in the hydrogenation reaction through a condenser and condensate separator, cooling the separated hydrogen to a temperature below 100° C. to condense water and vapors therefrom, separating the hydrogen from the water and condensed vapors, heating and recirculating the hydrogen through the reaction autoclave while maintaining the hydrogenation pressure on said hydrogen and separately maintaining the rate of flow of the fatty material through the reaction autoclave to insure the desired degree of hydrogenation.

9. The continuous method of catalytically hydrogenating fatty material containing higher and lower molecular weight components under high pressure and temperature, which comprises introducing liquid fatty material and hydrogen heated substantially to hydrogenation temperature into a reaction zone, introducing a catalyst in a relatively unheated slurry of fatty material into said reaction zone, maintaining the hydrogenating pressure and temperature in said reaction zone, circulating hydrogen in excess amounting to at least ten volumes per volume of fatty material through said fatty material and catalyst more slowly flowing through said reaction zone, maintaining a substantially constant flow of fatty material and catalyst in a tortuous path through said reaction zone, separately maintaining the rate of flow of the fatty material through the reaction zone to insure the desired degree of hydrogenation, cooling the hydrogenated fatty material flowing from the reaction zone while maintaining the hydrogenation pressure thereon, and separating hydrogen, water and volatile reaction products from the cooled hydrogenated fatty material while under hydrogenation pressure, cooling and separating the excess hydrogen from the water and volatile reaction products and heating and recirculating the excess hydrogen through the reaction zone while maintaining the hydrogenating pressure in the reaction zone and on the recirculating hydrogen, decompressing and cooling the hydrogenated fatty material and separating the catalyst therefrom, and recirculating the catalyst in a relatively unheated slurry of fatty material through said reaction zone.

10. The method of high pressure hydrogenation for the production of alcohols from fatty materials, which comprises flowing the fatty material and catalyst continuously through a reaction zone maintained at hydrogenation pressure and temperature, flowing hydrogen in excess amounting to at least ten volumes per volume of fatty material through the fatty material more slowly flowing through said reaction zone at the pressure and temperature of the reaction zone, and preventing mixing of the incoming fatty material with the outgoing fatty material by causing said materials to flow in a tortuous path through said reaction zone, cooling the hydrogenated fatty material while maintaining the hydrogenation pressure thereon, and separating the excess hydrogen and products which volatilize at the pressure and temperature of the reaction zone from the hydrogenated fatty material, separately maintaining the rate of flow of the fatty material through the reaction zone to insure the desired degree of hydrogenation, continuously flowing the cooled hydrogenated fatty alcohols and catalyst from the reaction zone without reducing the pressure in the reaction zone, reducing the pressure on said alcohols and further cooling and separating the catalyst therefrom.

11. The method of continuous high pressure catalytic hydrogenation of fatty material to reduce the fatty materials to alcohols in a reaction zone with consequent formation of water, which comprises passing an excess of hydrogen flowing at a speed greater than the rate of flow of the fatty material through the fatty material undergoing hydrogenation, the volumetric rate of flow of the hydrogen being at least ten times the volumetric flow of the fatty material through the reaction zone, maintaining the fatty material in the presence of a catalyst under a temperature and pressure which effects reduction of the fatty material by hydrogenation, maintaining the flow of hydrogen through the fatty material at a rate which carries off the water formed in the reaction and which displaces the reaction conditions in the direction favorable to the production of more alcohols, cooling and separating the water and lighter ends from the hydrogen stream and recirculating the hydrogen while maintaining the hydrogenation pressure on the fatty materials undergoing hydrogenation and on the hydrogen stream, causing the fatty material and hydrogen to flow through the reaction zone in a tortuous path thereby preventing unhydrogenated fatty material from passing from the inlet to the outlet of the reaction zone and being carried out of the reaction zone by the excess hydrogen stream, and separately maintaining the flow of the fatty materials through the reaction zone at a rate which produces the alcohols corresponding to the fatty acids of the fatty materials treated.

12. The method of catalytically hydrogenating fatty materials containing higher and lower molecular weight components under high pressure and temperature, which comprises continuously introducing heated fatty material into the reaction zone, continuously introducing the catalyst into the heated fatty material as it eners the reaction zone, maintaining the reducing pressure and temperature conditions therein, circulating hydrogen in excess amounting to at least ten volumes per volume of fatty material through the fatty material while it is flowing more slowly than the hydrogen through the reaction zone and carrying off in the stream of excess hydrogen, water and reaction products which have volatilized at the temperature and pressure in the reaction zone, while leaving the bulk of the reduced fatty material in liquid phase in the reaction zone, causing the said fatty material and hydrogen to flow in a tortuous path within said reaction zone while maintaining the hydrogenation pressure and temperature thereon, cooling the hydrogen stream adjacent the point of separation from the liquid fatty material and condensing and returning to the liquid fatty material those products which condense near the temperature of the reaction zone, flowing the hydrogen stream, water and volatile reaction products from the reaction zone and further cooling the hydrogen stream and stripping the volatile products from the hydrogen stream and recirculating the hydrogen through the reaction zone, and maintaining the flow of the fatty material through the reaction zone at a rate which accomplishes the desired degree of hydrogenation.

References Cited in the file of this patent

UNITED STATES PATENTS

| | | |
|---|---|---|
| 2,486,693 | Spijker et al. | Nov. 1, 1949 |
| 2,597,074 | De Bartholomaeis et al. | May 20, 1952 |
| 2,650,941 | Koome et al. | Sept. 1, 1953 |

OTHER REFERENCES

Groggins: "Unit Processes in Organic Synthesis," 3rd ed., pp. 537, 538 and 548. Publ. by McGraw-Hill Book Co., New York, N. Y., 1947.